United States Patent Office 2,997,472
Patented Aug. 22, 1961

2,997,472
1-(AROYLALKYL)-4-ARYLPIPERAZINES
Paul Adriaan J. Janssen, Antwerpse Steenweg 16',
Vosselaar, near Turnhout, Belgium
No Drawing. Filed Mar. 26, 1959, Ser. No. 801,993
13 Claims. (Cl. 260—268)

The present invention relates to a new group of piperazine derivatives and more particularly to 1-(aroylalkyl)-4-arylpiperazines of the general structural formula

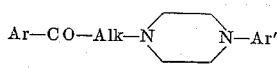

and the pharmaceutically acceptable non-toxic salts thereof wherein Ar and Ar' are monocyclic aryl radicals, preferably of less than 9 carbon atoms, and Alk is a lower alkylene radical separating the carbonyl group from the piperazine group by at least 3 carbon atoms.

In the foregoing structural formula the radicals Ar and Ar' can represent halophenyl radicals (such as fluorophenyl, chlorophenyl, bromophenyl, and iodophenyl), alkoxyphenyl radicals (such as methoxyphenyl, ethoxyphenyl, dimethoxyphenyl and trimethoxyphenyl) and monocyclic aromatic hydrocarbon radicals (such as phenyl, tolyl and xylyl).

The radical Alk represents a lower alkylene radical such as propylene, trimethylene, methylpropylene, tetramethylene, pentamethylene, and hexamethylene.

The compounds of the invention can be advantageously prepared by the condensation of a compound of the structural formula Ar—CO—Alk—Halogen with an appropriately selected 4-arylpiperazine, wherein Ar and Alk are defined as above. The condensation can be carried out in an inert solvent such as an aromatic hydrocarbon (e.g. benzene, toluene, xylene), a lower alkanol (e.g. ethanol, propanol, butanol), and a lower alkanone (e.g. butanone, pentanone. In certain cases the reaction can be usefully accelerated by use of elevated temperatures.

Alternatively, the compounds of this invention can be prepared by reacting a haloalkanonitrile of the formula NC—Alk—Halogen with a 4-arylpiperazine. The 4-aryl-1-piperazinealkanonitrile of the formula

thus obtained is heated with an arylmagnesium halide of the formula

Ar—Mg—Halogen under Grignard conditions, followed by acid hydrolysis of the adduct.

Another method for the preparation of the compounds of this invention employs the acid hydrolysis of the appropriate 4-aryl-1-piperazinealkanonitrile to form the acid which is then converted to the acyl halide. A Friedel-Crafts reaction using the appropriate aromatic hydrocarbon results in the formation of the product.

Still another procedure for the preparation of the compounds of this invention uses as a starting material a compound of the formula Ar—CO—Alk—N(CH$_2$CH$_2$X)$_2$ wherein X is a strong electronegative group such as halo, arylsulfonoxy, alkylsulfonoxy, and especially a chloro, bromo, or p-toluenesulfonoxy group. This compound is heated with aniline or a substituted aniline of the formula Ar'NH$_2$ Suitable aroylalkyl halides for use as intermediates for the preparation of compounds of the invention are, for example, γ-halobutyrophenones such as γ-chlorobutyrophenone, γ-bromobutyrophenone, and nuclearly substituted derivatives thereof in which the nuclear substituents are, for example, halogen atoms or alkyl or alkoxy radicals. These intermediates can be prepared conveniently by the Friedel-Crafts reaction including its milder variations employing, for example, γ-chlorobutyryl chloride in benzene or an appropriately substituted benzene such as p-toluene and m-xylene, a halogenated benzene such as chlorobenzene, bromobenzene and fluorobenzene, or an alkoxybenzene such as anisole and phenetole.

These intermediates can also be prepared by treating an ω-haloalkanonitrile with the appropriate arylmagnesium bromide followed by acid hydrolysis of the adduct.

The compounds of this invention are depressants of the central nervous system. Unlike the compounds of the first formula shown hereinabove wherein Alk is an ethylene or methylene group, they are tranquilizers and inhibit the righting reflex in experimental animals. They are also barbiturate potentiators and analgesic agents.

The organic bases of this invention form pharmaceutically useful non-toxic salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride, and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight, temperatures are expressed in degrees centigrade (° C.), and pressures are expressed in millimeters of mercury (mm.).

*Example 1*

A solution of 71 parts of γ-chlorobutyryl chloride and 63 parts of benzene is added with stirring and cooling to a suspension of 71 parts of aluminum chloride in 310 parts of benzene. After the addition is completed, the cooling bath is removed, and the stirring is continued for 30 minutes. The reaction mixture is poured into ice water. The benzene layer is separated, dried over anhydrous sodium sulfate, and filtered. The filtrate is concentrated under reduced pressure to remove the benzene and the residue is distilled to yield γ-chlorobutyrophenone boiling at about 134–137° C. at 5 mm. pressure.

*Example 2*

To a suspension of 341 parts of aluminum chloride in 1740 parts of carbon disulfide are added 96 parts of fluorobenzene with stirring and cooling. While the temperature is maintained at about 10° C., 141 parts of γ-chlorobutyryl chloride are added. After the addition is completed, the cooling bath is removed and the stirring is continued for 2 hours. The reaction mixture is poured into ice water. The organic layer is separated, washed with water, dried over anhydrous sodium sulfate, and filtered. The filtrate is concentrated under reduced pressure, and the residue is distilled to yield γ-chloro-p-fluorobutyrophenone boiling at about 136–142° C. at 6 mm. pressure.

Example 3

A mixture of 7.5 parts of γ-chlorobutyrophenone and 13.4 parts of 1-phenylpiperazine is allowed to remain at room temperature for 6 hours. The reaction is then continued by heating the mixture for 4 hours at a temperature of 105–110° C. After cooling to room temperature, 200 parts of ether are added, and the mixture is washed with water. The ethereal solution is dried over anhydrous potassium carbonate, filtered, and evaporated. The residue is taken up in a 4:1 mixture of 70% ethanol and ether. The solution is cooled and the precipitate thus obtained is recovered by filtration and recrystallized first from a 6:5 mixture of 2-propanol and water and then from a 3:2 mixture of 2-propanol and water. The 1-(γ-benzoylpropyl)-4-phenylpiperazine thus obtained melts at about 89–90° C.

Example 4

A mixture of 9.9 parts of δ-chloropentanophenone and 16.2 parts of 1-phenylpiperazine is heated for 10 hours at a temperature of 105–110° C. The mixture is treated with 300 parts of water and 240 parts of ether, and the ether layer is separated. The ether solution is evaporated, and the oily residue is taken up in 320 parts of ether, dried over anhydrous potassium carbonate, and filtered. Dry hydrogen chloride gas is passed through the filtrate. The resulting precipitate is collected on a filter and recrystallized first from a mixture of 200 parts of acetone and 320 parts of methanol and then from a mixture of 100 parts of acetone, 100 parts of 2-propanol, and 80 parts of methanol to yield 1-(δ-benzoylbutyl)-4-phenylpiperazine dihydrochloride melting at about 209–212° C.

Example 5

A mixture of 185 parts of bis(β-ethanol)amine and 177 parts of 1-amino-3-fluorobenzene is added to 280 parts of 12 N hydrochloric acid. After 264 parts of water are evaporated, the remaining solution is rendered alkaline with 336 parts of 44% sodium hydroxide solution. This solution is extracted with chloroform. The organic layer is separated, dried over anhydrous potassium carbonate, filtered, and fractionated to yield 1-(m-fluorophenyl)-piperazine boiling at about 145–155° at 3 mm. pressure.

A mixture of 8.5 parts of γ-chlorobutyrophenone and 17 parts of 1-(m-fluorophenyl)piperazine is heated at 100° C. for 10 hours. The reaction mixture is then boiled with 600 parts of diisopropyl ether, and the precipitate is collected on a filter. The filtrate is washed with water. The ether layer is separated and concentrated to about 80 parts. By cooling this solution to about —15° C., the base crystallizes and is collected on a filter. Upon recrystallization from diisopropyl ether, 1-(γ-benzoylpropyl)-4-(m-fluorophenyl)piperazine melts at about 80.2–81.6° C.

Example 6

A mixture of 157.7 parts of bis(β-ethanol)amine and 187.2 parts of 1-amino-4-fluorobenzene is introduced into a flask. The mixture is cooled on an ice bath, whereupon 325 parts of 12 N hydrochloric acid are added portionwise. Approximately 290 parts of water are evaporated, and to the remaining solution is added a solution of 128 parts of sodium hydroxide in 225 parts of water. The solution is diluted with water and extracted with chloroform. The organic layer is separated, dried over anhydrous potassium carbonate, filtered, and fractionated to yield 1-(p-fluorophenyl)piperazine boiling at 105–120° C. at 1 mm. pressure.

A mixture of 9.1 parts of γ-chlorobutyrophenone, 23 parts of 1-(p-fluorophenyl)piperazine, and 0.1 part of potassium iodide in 120 parts of toluene is heated in a sealed tube for 72 hours at a temperature of 145–150° C. The reaction mixture is cooled and then treated with 500 parts of water and 750 parts of ether. The ether layer is separated, dried over anhydrous potassium carbonate, and filtered. Anhydrous hydrogen chloride gas is introduced. The resulting precipitate is collected and recrystallized from a 1:2:2 mixture of acetone, 2-propanol and methanol, respectively. The 1-(γ-benzoylpropyl)-4-(p-fluorophenyl)piperazine dihydrochloride melts at about 214.5–217° C. The mother liquor is concentrated to yield a second crop. The dihydrochloride is dissolved in water and an excess of sodium hydroxide is added. The precipitated free base is collected and recrystallized from ethanol to yield 1-(γ-benzoylpropyl)-4-(p-fluorophenyl)-piperazine melting at about 104–105.5° C.

Example 7

A mixture of 9.1 parts of γ-chlorobutyrophenone and 19.6 parts of 1-(m-chlorophenyl)piperazine is heated for 10 hours at a temperature of 105–110° C. The mixture is cooled to room temperature and then treated with 500 parts of water and 240 parts of diisopropyl ether. The ether layer is separated, concentrated to about ⅔ of its volume, and treated with activated charcoal. Upon cooling, there precipitates the 1-(γ-benzoylpropyl)-4-(m-chlorophenyl)piperazine which is recovered by filtration and is found to melt at about 88–90° C.

Example 8

In an open flask a mixture of 9.1 parts of γ-chlorobutyrophenone and 19.7 parts of 1-(p-chlorophenyl)-piperazine is heated for 10 hours at a temperature of 105–110° C. After the contents of the flask are cooled to room temperature, 160 parts of ether are added and the solution is washed with water. The aqueous layer is separated and extracted with 160 parts of ether. The ethereal solutions are combined, dried over anhydrous potassium carbonate, filtered, and evaporated. The residue is recrystallized from a 10:1 mixture of low-boiling petroleum ether and ethanol. The white crystalline 1 - (γ - benzoylpropyl) - 4 - (p - chlorophenyl)piperazine melts at about 127–128.4° C.

Example 9

A mixture of 9.1 parts of γ-chlorobutyrophenone and 17.6 parts of 1-(o-tolyl)piperazine is maintained at 75° C. for 10 hours. The reaction mixture is treated with 240 parts of ether and 300 parts of water. Evaporation of the ether solution leaves an oily residue which is taken up in 800 parts of boiling ether. After a small quantity of insoluble material is filtered off, dry hydrogen chloride gas is passed through the solution. The resulting precipitate is collected on a filter and recrystallized from a 5:4:3 mixture of 2-propanol, methanol, and acetone, respectively. The 1-(γ-benzoylpropyl)-4-(o-tolyl)piperazine hydrochloride melts at about 205–207° C.

Example 10

Substitution of 17.6 parts of 1-(m-tolyl)-piperazine for the 1-(p-chlorophenyl)piperazine in Example 8 yields 1-(γ-benzoylpropyl)-4-(m-tolyl)piperazine which is recrystallized first from a 7:1 mixture of ethanol and water and then from a 13:1 mixture of low boiling petroleum ether and ethanol. The compound melts at about 78–79° C.

Example 11

Substitution of 17.6 parts of 1-(p-tolyl)-piperazine for the 1-(p-chlorophenyl)piperazine in Example 8 yields 1-(γ-benzoylpropyl)-4-(p-tolyl)piperazine which is recrystallized from an equimolar mixture of 2-propanol and water. The compound melts at about 87.5–88.3° C.

Example 12

In a flask a mixture of 5.3 parts of γ-chlorobutyrophenone and 11 parts of 1-(2,5-xylyl)piperazine is heated for 10 hours at a temperature of 100° C. The reaction mixture is boiled with 400 parts of diisopropyl ether and the residue is filtered off. The filtrate is avaporated. The residue is taken up in 160 parts of 2-propanol. Anhydrous hydrogen chloride gas is passed through the solution, whereupon there precipitates the hydrochloride which is collected on a filter. The gray, amorphous 1-(γ-benzoylpropyl)-4-(2,5-xylyl)piperazine hydrochloride melts at about 229–230° C.

*Example 13*

In an open flask a mixture of 5.82 parts of γ-chlorobutylrophenone and 12.5 parts of 1-(o-anisyl)piperazine is heated for 10 hours at a temperature of 110° C. The solid reaction mixture is extracted with 240 parts of boiling diisopropyl ether. The ethereal solution is then cooled, washed with water, dried over anhydrous potassium carbonate, and filtered. Gaseous hydrogen chloride is introduced. The resulting precipitate is collected on a filter and recrystallized from 2-propanol to yield 1 - (γ - benzoylpropyl) - 4 - (o - anisyl)piperazine dihydrochloride melting at about 207.5–209.5° C.

*Example 14*

A mixture of 7.46 parts of γ-chlorobutyrophenone and 16.8 parts of 1-(p-anisyl)piperazine is heated in an open flask for 10 hours at a temperature of 110° C. The reaction mixture is treated with 600 parts of boiling ether. The insoluble residue is filtered off, and the filtrate is allowed to cool to room temperature. The product is collected on a filter and recrystallized from diisopropyl ether to yield 1-(γ-benzoylpropyl)-4-(p-anisyl)-piperazine melting at about 85–86.2° C.

*Example 15*

A mixture of 10 parts of γ-chloro-p-fluorobutyrophenone and 16.2 parts of 1-phenylpiperazine is allowed to stand at room temperature for 72 hours. To the reaction mixture are added 400 parts of ether. The ethereal solution is washed with water, dried over anhydrous potassium carbonate, filtered, and evaporated to dryness. The residue is recrystallized from 2-propanol to yield 1-[γ-(p-fluorobenzoyl)propyl]-4-phenylpiperazine melting at about 104–106° C.

*Example 16*

In an open flask a mixture of 9 parts of γ-chloro-p-fluorobutyrophenone and 17 parts of 1-(m-fluorophenyl)-piperazine is heated for 10 hours at a temperature of 100° C. The reaction mixture is extrated with boiling diisopropyl ether, filtered and cooled. The precipitate thus obtained is collected on a filter and dissolved in 240 parts of 2-propanol. Anhydrous hydrogen chloride gas is passed through the solution. The solution is boiled and cooled, whereupon there precipitates the 1-[γ-(p-fluorobenzoyl) - propyl] - 4 - (m - fluorophenyl)piperazine dihydrochloride melting at about 198–200° C.

*Example 17*

A mixture of 7.5 parts of γ-chloro-p-fluorobutyrophenone and 13.5 parts of 1-(p-fluorophenyl)-piperazine is heated in an open flask for 10 hours at a temperature of 100° C. The contents of the flask are cooled and then treated with water and ether. The organic layer is separated, dried over anhydrous potassium carbonate, and filtered. Anhydrous hydrogen chloride gas is introduced into the solution. The resulting precipitate is collected and dissolved in a 1:1 mixture of acetone and 2-propanol. The solutiton is permitted to stand for 15 hours at −20° C., and the precipitate thus formed is filtered off. The filtrate is allowed to evaporate without heating. The crystalline residue is dissolved in 240 parts of 2-propanol, whereupon the alcoholic solvent is evaporated in vacuo without heating. Crystallization occurs immediately and the crystalline solid (1) is collected on a filter. The filtrate is maintained at −20° C. causing 1 - [γ - (p - fluorobenzoyl)propyl] - 4 - (p - fluorophenyl)-piperazine dihydrochloride to crystallize out as a grey-brown, amorphous powder melting at about 199.5–202.15° C.

The crystalline solid (1) is redissolved in 2-propanol, whereupon gaseous hydrogen chloride is introduced. Precipitation is induced by the evaporation of the solvent. The product is collected on a filter and recrystallized from a 1:3 mixture of acetone and 2-propanol to yield 1-[γ-(p-fluorobenzoyl]-4-(p-fluorophenyl)-piperazine hydrochloride melting at about 180.2–181.6° C.

*Example 18*

A mixture of 10.3 parts of γ-chloro-p-fluorobutyrophenone and 19.6 parts of 1-(o-chlorophenyl)piperazine is heated for 10 hours at a temperature of 110° C. To the reaction mixture are added 600 parts of ether. The solution is washed with water, and the water layer is extracted with ether. The combined ethereal solution is dried over anhydrous potassium carbonate and treated with an excess of dry, gaseous hydrogen chloride. The precipitated hydrochloride is collected on a filter and recrystallized from 2-propanol to yield 1-[γ-(p-fluorobenzoyl)propyl]-4-(o-chlorophenyl)piperazine hydrochloride melting at about 211–214° C.

*Example 19*

A mixture of 10 parts of γ-chloro-p-fluorobutyrophenone and 19.6 parts of 1-(m-chlorophenyl)piperazine is heated in an open flask at a temperature of 110° C. The mixture is cooled and treated with 750 parts of water and 400 parts of ether. The mixture is then filtered, and the ether layer is separated and evaporated at room temperature. The residue is taken up in 400 parts of ether, whereupon an excess of anhydrous hydrogen chloride gas is introduced into the solution. The hydrochloride is collected on a filter and recrystallized from a mixture of acetone and of methanol to yield 1-[γ-(p-fluorobenzoyl)-propyl]-4-(m-chlorophenyl)piperazine hydrochloride melting at about 197.8–199.5° C.

*Example 20*

Substitution of 10 parts of γ-chloro-p-fluorobutyrophenone for the γ-chlorobutylrophenone in Example 8 yields 1-[γ-(p-fluorobenzoyl)propyl]-4-(p-chlorophenyl)piperazine which is recrystallized first from ethanol and then from a 40:3 mixture of low-boiling petroleum ether and ethanol. The white crystals melt at about 96–98° C.

*Example 21*

Substitution of 10 parts of γ-chloro-p-fluorobutyrophenone for the γ-chlorobutyrophenone in Example 9 yields 1-[γ-(p-fluorobenzoyl)propyl]-4-(o-tolyl)piperazine hydrochloride which is recrystallized first from a 5:11:1 mixture of acetone, 2-propanol, and methanol and then from a 1:2 mixture of acetone and methanol. The white crystals decompose at about 238–241° C.

*Example 22*

In an open flask a mixture of 10 parts of γ-chloro-p-fluorobutyrophenone and 17.6 parts of 1-(m-tolyl)piperazine is heated for 10 hours at a temperature of 100–110° C. Upon cooling, the solution is extracted with water and ether; the ether layer is separated, dried over anhydrous potassium carbonate, and filtered. Anhydrous hydrogen chloride gas is then passed through the solution to yield 1-[γ-(p-fluorobenzoyl)propyl]-4-(m-tolyl)-piperazine dihydrochloride, which upon recrystallization from a mixture of acetone and methanol, decomposes at about 210–213° C.

*Example 23*

A mixture of 13.3 parts of γ-chloro-p-fluorobutyrophenone and 17.6 parts of 1-(p-tolyl)piperazine is heated in an open flask for 10 hours at a temperature of 105–110° C. After cooling to room temperature, the solid reaction mixture is treated with 2000 parts of water and 400 parts of ether. The ether solution is dried over anhydrous potassium carbonate and then evaporated. The residue is recrystallized from a mixture of equal parts of 2-propanol and water to yield 1-[γ-(p-fluorobenzoyl)propyl]-4-(p-tolyl)piperazine melting at about 99–101° C.

*Example 24*

To 157.5 parts of bis(β-ethanol)amine in 212 parts of 1-amino-2,5-xylene is added portionwise 270 parts of 12 N hydrochloric acid. When the addition is completed, the reaction mixture is heated on an oil bath, and 253 parts of water are evaporated. The solution is cooled and rendered alkaline with 133 parts of sodium hydroxide in 222 parts of water. The solution is diluted and extracted with chloroform. The chloroform layer is separated, dried over anhydrous potassium carbonate, filtered, and fractionated to yield 1-(2′,5′-xylyl)piperazine boiling at 110–120° C. at 1 mm. pressure.

A mixture of 10 parts of γ-chloro-p-fluoro-butyrophenone and 19 parts of 1-(2′,5′-xylyl)piperazine is heated in a flask at a temperature of 100° C. The contents of the flask are boiled with 600 parts of ether, and the residue is filtered off. The ethereal solution is washed with water and evaporated. The oily residue is dissolved in 400 parts of 2-propanol, and the solution is treated with dry, gaseous hydrogen chloride. The precipitate is recrystallized from a mixture of 2-propanol and methanol to yield 1-[γ-(p-fluorobenzoyl)propyl]-4-(2′,5′-xylyl)piperazine dihydrochloride melting at about 237.5–239.5° C.

*Example 25*

A mixture of 6.6 parts of γ-chloro-p-fluoro-butyrophenone and 12.5 parts of 1-(o-anisyl)piperazine is heated for 10 hours at a temperature of 110° C. The reaction mixture is treated with 800 parts of ether and filtered. The ether layer is washed with water, dried over anhydrous potassium carbonate and filtered, whereupon hydrogen chloride gas is introduced into the solution. The precipitate is collected on a filter and dissolved in a mixture of 240 parts of 2-propanol and 80 parts of acetone to yield 1-[γ-(p-fluorobenzoyl)propyl]-4-(o-anisyl)piperazine hydrochloride. This monohydrochloride is collected on a filter and dissolved in 240 parts of 2-propanol. Anhydrous, gaseous hydrogen chloride is passed through the solution. On cooling, the 1-[γ-(p-fluorobenzoyl)propyl]-4-(o-anisyl)piperazine dihydrochloride precipitates.

A second crop of product is obtained by passing hydrogen chloride gas through the solution of mother liquors. The pale-brown, amorphous powder is collected on a filter and found to melt at about 205–205.5° C.

This salt is dissolved in water and treated with sodium hydroxide. The precipitated base is recovered by filtration and recrystallized from diisopropyl ether. The white crystals melt at about 67.5–68.5° C.

*Example 26*

Substitution of 8.44 parts of γ-chloro-p-fluorobutyrophenone for the γ-chlorobutyrophenone in Example 13 yields 1-[γ-(p-fluorobenzoyl)propyl]-4-(p-anisyl)piperazine melting at about 104.6–105.6° C.

*Example 27*

Substitution of an equimolar amount of chlorobenzene for the fluorobenzene in Example 2 yields γ,p-dichlorobutyrophenone boiling at about 185–190° C., at 12 mm. pressure.

A mixture of 10.8 parts of γ,p-dichlorobutyrophenone and 16.2 parts of 1-phenylpiperazine is heated for 7 hours at a temperature of 160° C. After cooling, the mixture is taken up in 600 parts of ether. The ether layer is extracted with water, separated, dried over anhydrous potassium carbonate, filtered and evaporated. The residue is recrystallized from a mixture of acetone and methanol to yield 1-[γ-(p-chlorobenzoyl)propyl]-4-phenylpiperazine melting at about 113.5–114.4° C.

*Example 28*

A mixture of 10.8 parts of γ,p-dichlorobutyrophenone and 19.6 parts of 1-(m-chlorophenyl)piperazine is heated for 10 hours at a temperature of 100° C. The mixture is boiled with 800 parts of ether and then filtered. The filtrate is washed with water, dried over anhydrous potassium carbonate, filtered, and evaporated until a solid separates. The solution is cooled and the precipitate is recovered by filtration. The 1-[γ-(p-chlorobenzoyl)propyl]-4-(m-chlorophenyl)piperazine is recrystallized from diisopropyl ether and is found to melt at about 86–88° C.

*Example 29*

In an open flask a mixture of 12 parts of γ,p-dichlorobutyrophenone and 17.6 parts of 1-(m-tolyl)piperazine is heated for 10 hours at a temperature of 110° C. The solid reaction product is boiled with 800 parts of diisopropyl ether. The residue is filtered off and the solution is cooled. The 1-[γ-(p-chlorobenzoyl)propyl]-4-(m-tolyl)piperazine thus obtained is collected on a filter and recrystallized from diisopropyl ether to yield white plates melting at about 99.6–100.4° C.

*Example 30*

Substitution of 17.6 parts of 1-(p-tolyl)piperazine for the 1-(m-chlorophenyl)piperazine in Example 28 yields 1 - [γ - (p-chlorobenzoyl)propyl] - 4 - (p-tolyl)piperazine melting at about 129.5–130.5° C.

*Example 31*

Substitution of 16.8 parts of 1-(p-anisyl)piperazine for the 1-(m-chlorophenyl)piperazine in Example 28 yields 1- [γ - (p- chlorobenzoyl)propyl] - 4- (p-anisyl)piperazine which is recrystallized from diisopropyl ether. The crystals melt at about 126.6–127.8° C.

*Example 32*

Substitution of an equimolar amount of toluene for the fluorobenzene in Example 2 yields γ-chloro-p-methylbutyrophenone melting at 31.5° C.

A mixture of 8 parts of γ-chloro-p-methylbutyrophenone and 14 parts of 1-phenylpiperazine is maintained at about 105° C. for 5 hours. To the reaction mixture are added 800 parts of ether and 500 parts of water. The organic layer is separated, dried over anhydrous potassium carbonate, filtered, and evaporated. The residue is recrystallized from a 10:7 mixture of low-boiling petroleum ether and ethanol to yield 1-[γ-(-toluyl)propyl]-4-phenylpiperazine melting at about 103–104.8° C.

*Example 33*

A mixture of 9.8 parts of γ-chloro-p-methylbutyrophenone and 19.6 parts of 1-(o-chlorophenyl)piperazine is heated in an open flask for 8 hours at a temperature of 100° C. After the contents of the flask are cooled to room temperature, 600 parts of ether are added, and the solution is washed with water. The organic layer is separated, dried over anhydrous potassium carbonate, and evaporated. The residue is first recrystallized from a mixture of equal parts of water and 2-propanol and then from a boiling mixture of water and 2-propanol to which is added activated charcoal. The solution is filtered and then cooled to about 0° C., to yield 1-[γ-(p-toluyl)propyl]-4-(o-chlorophenyl)piperazine. The product is collected on a filter and found to melt at about 106–107° C.

*Example 34*

Substitution of 19.6 parts of 1-(m-chlorophenyl)-piperazine for the 1-(o-chlorophenyl)piperazine in Example 33 yields 1-[γ-(p-toluyl)propyl]-4-(m-chlorophenyl)- piperazine. This product is recrystallized from an equal parts mixture of acetone and methanol and is found to melt at about 124.5–125.5° C.

*Example 35*

In an open flask a mixture of 9.8 parts of γ-chloro-p-methylbutyrophenone and 19.6 parts of 1-(p-chlorophenyl)piperazine is heated for 10 hours at a temperature of 110° C. The mixture is extracted with a 2:3 mixture of ether and water, and the ether layer is separated, dried over anhydrous potassium carbonate, filtered, and evaporated. The residue is recrystallized from a 3:2 mixture of 2-propanol and water to yield 1-[γ-(p-toluyl)propyl]-4-(p-chlorophenyl)piperazine melting at about 134.5–136° C.

*Example 36*

Substitution of 17.6 parts of 1-(m-tolyl)-piperazine for the 1-(o-chlorophenyl)piperazine in Example 33 yields 1-[γ-(p-toluyl)propyl]-4-(m-tolyl)piperazine. This product is recrystallized from 2:1 mixture of 2-propanol and water and is found to melt at about 87–88.5° C.

*Example 37*

Substitution of 17.6 parts of 1-(p-tolyl)piperazine for the 1-(o-chlorophenyl)piperazine in Example 33 yields 1-[γ-(p-toluyl)propyl]-4-(p-tolyl)piperazine which is recrystallized from a 7:5 mixtures of methanol and acetone and decolorized by treatment with activated charcoal. The amorphous powder melts at about 117.2–119.2° C.

*Example 38*

Substitution of 8.04 parts of γ-chloro-p-methylbutyrophenone for the γ,p-dichlorobutyrophenone and substitution of 16.8 parts of 1-(p-anisyl)piperazine for the 1-(m-tolyl)piperazine in Example 29 yields 1-[γ-(p-toluyl)propyl]-4-(p-anisyl)piperazine melting at about 123.2–124° C.

*Example 39*

Substitution of an equimolar amount of p-xylene for the fluorobenzene in Example 2 yields γ-chloro-2,5-dimethylbutyrophenone boiling at about 142–148° C. at 7 mm. pressure.

In an open flask a mixture of 12.5 parts of γ-chloro-2,5-dimethylbutyrophenone and 17.6 parts of 1-phenylpiperazine is heated in an open flask for 5 hours at a temperature of 105–110° C. After the contents of the flask are cooled, the mixture is treated with 800 parts of ether and 500 parts of water. The ether layer is separated, dried over anhydrous potassium carbonate, and filtered. Dry, gaseous hydrogen chloride is introduced. The precipitate is recovered by filtration and recrystallized from 2-propanol to yield 1-[γ-(2′,5′-xyloyl)propyl]-4-phenylpiperazine hydrochloride melting at 179.5–180.5° C.

*Example 40*

Substitution of an equimolar amount of anisole for the fluorobenzene in Example 2 yields γ-chloro-p-methoxybutyrophenone boiling at about 175° C. at 6 mm. pressure.

In a sealed reactor a mixture of 10.6 parts of γ-chloro-p-methoxybutyrophenone, 16.2 parts of 1-phenylpiperazine, and 0.1 part of potassium iodide in 120 parts of dry toluene is heated for 72 hours at a temperature of 145–150° C. The reaction mixture is cooled to room temperature and then filtered. Upon cooling the filtrate, there precipitates the product which is collected on a filter and recrystallized from diisopropyl ether to yield 1-[γ-(p-anisoyl)propyl]-4-phenylpiperazine melting at about 126.6–127.5° C.

*Example 41*

Substitution of 10 parts of γ-chloro-p-methoxy-butyrophenone for the γ-chlorobutyrophenone in Example 5 yields 1-[γ-(p-anisoyl)propyl]-4-(m-fluorophenyl)piperazine melting at about 111–113° C.

*Example 42*

In a sealed tube a mixture of 10.6 parts of γ-chloro-p-methoxybutyrophenone, 23 parts of 1-(p-fluorophenyl)-piperazine, and 0.1 part of potassium iodide in 120 parts of toluene is heated for 72 hours at a temperature of 145–150° C. After cooling, the reaction mixture is treated with 500 parts of water and 750 parts of ether. The organic layer is separated, dried over anhydrous potassium carbonate, and filtered. Dry hydrogen chloride gas is passed through the solution, whereupon a semisolid precipitate is obtained. The solvent is decanted and the crude salt is recrystallized from methanol. The hydrochloride salt is dissolved in boiling water. By adding an excess of sodium hydroxide to the hot solution, the base is liberated as an oil which solidifies on cooling to room temperature. The product is collected on a filter and recrystallized from ethanol to yield 1-[γ-(p-anisoyl)-propyl]-4-(p-fluorophenyl)piperazine melting at about 121.2–121.8° C.

*Example 43*

Substitution of 11 parts of γ-chloro-p-methoxybutyrophenone for the γ-chlorobutyrophenone and substitution of 1-(o-chlorophenyl)piperazine for the 1-(p-anisyl)-piperazine in Example 14 yields 1-[γ-(p-anisoyl)propyl]-4-(o-chlorophenyl)piperazine melting at about 73.5–73.8° C.

*Example 44*

A mixture of 10.6 parts of γ-chloro-p-methoxybutyrophenone and 19.6 parts of 1-(m-chlorophenyl)-piperazine is heated in an open flask for 10 hours at a temperature of 100° C. Then 400 parts of ether are added to the reaction mixture. The ether solution is washed with water, dried over anhydrous potassium carbonate, filtered, and evaporated. The residue is recrystallized from an equimolar mixture of 2-propanol and water to yield 1-[γ-(p-anisoyl)propyl]-4-(m-chlorophenyl)piperazine melting at about 101.6–102.4° C.

*Example 45*

Substitution of 19.7 parts of 1-(p-chlorophenyl)piperazine for the 1-(m-chlorophenyl)piperazine in Example 44 yields 1-[γ-(p-anisoyl)propyl]-4-(p-chlorophenyl)-piperazine which is recrystallized from 2-propanol. The white crystals melt at about 128.6–130° C.

*Example 46*

Substitution of 11 parts of γ-chloro-p-methoxybutyrophenone for the γ-chlorobutyrophenone in Example 9 yields 1-[γ-(p-anisoyl)propyl]-4-(o-tolyl)piperazine hydrochloride which is recrystallized first from a 5:4 mixture of acetone and methanol and then from an equimolar mixture of acetone and methanol. The white crystals melt at about 239.5–240.5° C.

*Example 47*

Substitution of 11 parts of γ-chloro-p-methoxybutyrophenone for the γ-chlorobutyrophenone and substitution of 1-(m-tolyl)piperazine for the 1-(p-chlorophenyl)piperazine in Example 8 yields 1-[γ-(p-anisoyl)propyl]-4-(m-tolyl)piperazine which is recrystallized first from a 7:3 mixture of ethanol and water in the presence of activated charcoal and then from an equimolar mixture of 2-propanol and water. The white crystals melt at about 105–106° C.

*Example 48*

Substitution of 17.6 parts of 1-(p-tolyl)piperazine for the 1-(m-chlorophenyl)piperazine in Example 44 yields 1-[γ-(p-anisoyl)propyl]-4-(p-tolyl)piperazine which, up-

Example 49

A mixture of 10.6 parts of γ-chloro-p-methoxybutyrophenone and 19.2 parts of 1-(2',5'-xylyl)piperazine is heated for 10 hours at a temperature of 105–110° C. Upon cooling, the solid reaction mixture is boiled with 600 parts of ether. The residue is filtered off. The filtrate is washed with water and evaporated leaving an oily residue which is dissolved in 240 parts of 2-propanol. An excess of hydrogen chloride gas is passed through the alcoholic solution, whereupon a precipitate forms which is then brought into solution by adding an additional 160 parts of 2-propanol and heating. The solution is filtered, and the filtrate is cooled to yield 1-[γ-(p-anisoyl)propyl]-4-(2',5'-xylyl)piperazine hydrochloride which is recrystallized from 2-propanol and found to melt at about 225–226° C.

Example 50

A mixture of 7.8 parts of γ-chloro-p-methoxybutyrophenone and 12.5 parts of 1-(o-methoxyphenyl)piperazine is heated for 10 hours at a temperature of 100° C. The mixture is extracted first with 400 parts of boiling diisopropyl ether and then with 200 parts of boiling diisopropyl ether. To the combined ether solution is introduced dry, gaseous hydrogen chloride. The resulting precipitate is collected on a filter and recrystallized first from a mixture of acetone, 2-propanol, and methanol and then from 2-propanol to yield 1-[γ-(p-anisoyl)propyl]-4-(o-anisyl)piperazine dihydrochloride melting at about 197–198.2° C.

Example 51

A mixture of 9.02 parts of γ-chloro-p-methoxybutyrophenone and 16.8 parts of 1-(p-methoxyphenyl)piperazine is heated for 10 hours at a temperature of 110° C. The reaction mixture is boiled with 800 parts of diisopropyl ether. The residue is filtered off and the solution is cooled. The resulting product is collected on a filter. Upon recrystallization from 2-propanol, the 1-[γ-(p-anisoyl)propyl]-4-(p-anisyl)piperazine melts at about 125.6–127.4° C.

Example 52

A mixture of 141 parts of γ-chlorobutyryl chloride and 138.2 parts of m-dimethoxybenzene is dissolved in 1000 parts of nitrobenzene. The solution is cooled to −10° C., and this temperature is maintained while 267 parts of aluminum chloride are added under stirring in the course of about 90 minutes. The reaction mixture is then maintained at 0° C. for 72 hours and then at room temperature for 36 hours. The mixture is poured into a mixture of 300 parts of concentrated hydrochloric acid and 250 parts of ice. After the decomposition is completed, 1100 parts of ether are added. The organic layer is separated, washed with water, washed with 5% sodium hydroxide solution, and washed again with water. The solution is dried over anhydrous sodium sulfate and filtered. The solvents are evaporated in vacuo. The residue is treated with diisopropyl ether. Upon cooling, a crystalline product is obtained. The γ-chloro-o,p-dimethoxybutyrophenone melts at about 61–62° C.

A mixture of 12.2 parts of γ-chloro-o,p-dimethoxybutyrophenone and 16.2 parts of 1-phenylpiperazine is heated on an oil bath for 10 hours at a temperature of 100–105° C. The reaction mixture is treated with 750 parts of water, 600 parts of ether, and 8 parts of acetone. The organic layer is separated, dried over anhydrous potassium carbonate and evaporated. The residue is taken up in dry ether and anhydrous hydrogen chloride gas is passed through the solution, whereupon an oily hydrochloride is obtained. After decantation of the solvent, the oil solidifies in acetone. This residue is dissolved in an equimolar mixture of acetone and 2-propanol. An amorphous precipitate forms which is collected on a filter and recrystallized from a mixture of acetone and 2-propanol to yield 1-[γ-(o,p-dimethoxybenzoyl)propyl]-4-phenylpiperazine dihydrochloride melting at about 195–196° C.

Substitution of an equivalent amount of o-dimethoxybenzene for the m-dimethoxybenzene in the first paragraph of this example yields γ-chloro-m,p-dimethoxybutyrophenone.

A mixture of 12.1 parts of γ-chloro-m,p-dimethoxybutyrophenone and 16.2 parts of 4-phenylpiperazine is heated at 100° C. for 15 hours. The reaction mixture is then treated with 500 parts of water and 400 parts of ether. The water layer is extracted with ether; the ether solutions are combined, dried over potassium carbonate and evaporated. The oily residue is taken up in 400 parts of diisopropyl ether and concentrated to about ¼ of its volume. The semi-solid precipitate is collected by filtration and treated with 20 parts of acetone. The mixture is then maintained at about −15° C. for 48 hours and the solid is then collected. Upon recrystallization from diisopropyl ether there is obtained 1-[γ-(m,p-dimethoxybenzoyl)propyl]-4-phenylpiperazine melting at about 101–103.5° C.

Example 53

Substitution of 11 parts of γ-chloro-o,p-dimethoxybutyrophenone for the γ-chlorobutyrophenone in Example 9 yields 1-[γ-(o,p-dimethoxybenzoyl)propyl]-4-(o-tolyl)piperazine dihydrochloride which is redissolved in 2-propanol and retreated with anhydrous hydrogen chloride gas. The hydrochloride is collected on a filter and recrystallized from 2-propanol. The white, amorphous powder melts at about 177–179.2° C.

Example 54

A mixture of 7 parts of γ-chloro-o,p-dimethoxybutyrophenone and 12 parts of 1-(o-methoxyphenyl)piperazine is heated for 10 hours at a temperature of 100° C. The mixture is boiled with 200 parts of ether and the solution is filtered. The filtrate is washed with water, dried over anhydrous potassium carbonate, filtered, and evaporated. The residue is taken up in ether and dry hydrogen chloride gas is passed through the solution. The precipitate is recrystallized first from a mixture of 2-propanol and methanol, and then from a mixture of 2-propanol and acetone to yield 1-[γ-(o,p-dimethoxybenzoyl)propyl]-4-(o-anisyl)piperazine hydrochloride melting at about 214–215° C.

Example 55

Substitution of an equimolar amount of p-dimethoxybenzene for the fluorobenzene used in Example 2 yields γ-chloro-2,5-dimethoxybutyrophenone boiling at about 150–190° C. at 4 mm. pressure.

A mixture of 7.2 parts of γ-chloro-2,5-dimethoxybutyrophenone and 9.6 parts of 1-phenylpiperazine is heated for 10 hours at a temperature of 100–110° C. The mixture is treated with 1000 parts of water and 600 parts of ether and then filtered. The ether layer is separated, dried over anhydrous potassium carbonate, filtered, and evaporated. The residue is taken up in 800 parts of acetone, treated with activated charcoal, and filtered. Dry hydrogen chloride gas is passed through the solution which is then cooled and filtered. The mother liquor is evaporated and the residue is treated with a mixture of 20 parts of acetone and 40 parts of ether, whereupon there precipitates the salt which is collected on a filter and dissolved in water. The solution is treated with activated charcoal, filtered, and then treated with sodium hydroxide solution. The precipitated base is recovered by filtration, dissolved in acetone, and treated again with dry, gaseous hydrogen chloride in order to obtain the hydrochloride. It is then collected on a filter. The 1-[γ-(2',5'-dimethoxybenzoyl)propyl]-4-phenylpiperazine dihydrochloride decomposes at about 179–180° C.

Example 56

Substitution of an equimolar amount of 1,2,3-trimethoxybenzene for the fluorobenzene in Example 2 yields γ-chloro-2,3,4-trimethoxybutyrophenone melting at about 83.8–85.4° C.

A mixture of 7.5 parts of γ-chloro-2,3,4-trimethoxybutyrophenone and 8.8 parts of 1-phenylpiperazine is heated for 10 hours at a temperature of 100–110° C. The reaction mixture is boiled with 400 parts of ether, and the solid residue is filtered off. The ether layer is washed with water, dried over anhydrous potassium carbonate, filtered, and evaporated. This residue is recrystallized from acetone to yield 1-[γ-(2′,3′,4′-trimethoxybenzoyl)propyl]-4-phenylpiperazine melting at about 113–116.2° C.

Example 57

Substitution of an equimolar amount of phenetole for the fluorobenzene in Example 2 yields γ-chloro-p-ethoxybutyrophenone.

Substitution of 11.4 parts of γ-chloro-p-ethoxybutyrophenone for the γ-chloro-p-methoxybutyrophenone and substitution of 16.2 parts of 1-phenylpiperazine for the 1-(m-chlorophenyl)piperazine used in Example 44 yields 1-[γ-(p-ethoxybenzoyl)propyl]-4-phenylpiperazine which is recrystallized from diisopropyl ether and found to melt at about 125.2–126.8° C.

Example 58

Substitution of 11.4 parts of γ-chloro-p-ethoxybutyrophenone for the γ-chloro-p-methoxybutyrophenone and substitution of 17.6 parts of 1-(m-tolyl)piperazine for 1-(p-methoxyphenyl)piperazine used in Example 51 yields, from the combined fractions, 1-[γ-(p-ethoxybenzoyl)propyl]-4-(m-tolyl)piperazine melting at about 113.4–113.8° C.

Example 59

Substitution of an equimolar amount of β-methyl-γ-chlorobutyryl chloride for the γ-chlorobutyryl chloride used in Example 1 yields β-methyl-γ-chlorobutyrophenone.

A mixture of 9 parts of β-methyl-γ-chlorobutyrophenone and 14.5 parts of 1-phenylpiperazine is heated for 10 hours at a temperature of 105–110° C. The solution is cooled and then boiled with 400 parts of ether. The solution is filtered; the filtrate is washed with water, dried over anhydrous potassium carbonate and filtered. Anhydrous hydrogen chloride gas is passed through the solution. The resulting precipitate is collected on a filter and recrystallized from 2-propanol to yield 1-(β-methyl-γ-benzoylpropyl)-4-phenylpiperazine dihydrochloride melting at about 219.5–221.5° C.

Example 60

A mixture of 7.5 parts of β-methyl-γ-chlorobutyrophenone and 13.4 parts of 1-(m-tolyl)piperazine is heated for 20 hours at a temperature of 100° C. The resulting oil is dissolved in 600 parts of ether and 500 parts of water. The ether layer is separated, dried over anhydrous calcium chloride, filtered, boiled with activated charcoal, and filtered again. Dry, gaseous hydrogen chloride is passed through the solution. The salt thus obtained is crystallized by washing with acetone. The crystalline product is recrystallized from a mixture of acetone, 2-propanol, and methanol. The hydrochloride is then dissolved in water and treated with sodium hydroxide solution. The solution is extracted with ether. The ether solution is evaporated and the remaining oil is dissolved in petroleum ether and induced to crystallize by scratching. The white, flaky crystals of 1-(β-methyl-γ-benzoylpropyl)-4-(m-tolyl)piperazine are recovered by filtration and are found to melt at about 32.8–33.8° C.

Example 61

A mixture of 5.5 parts of β-methyl-γ-chlorobutyrophenone and 10 parts of 1-(o-anisyl)piperazine is heated at a temperature of 100–110° C. for 24 hours. The reaction mixture is then extracted with water, dried over potassium carbonate and then hydrogen chloride gas is passed through the solution. The solution is cooled to about −20° C. for 50 hours and then concentrated to a small volume. The crystals are collected by filtration, dissolved in water and the solution is made basic by the addition of sodium hydroxide solution. The solution is extracted with ether and then the ether solution is evaporated to dryness. The residue is dissolved in equal parts of diisopropyl ether and acetone and then hydrogen chloride gas is passed through the solution. The precipitate is collected by filtration, after recrystallization from a mixture of acetone and 2-propanol, there is obtained 1 - (β - methyl - γ - benzoylpropyl) - 4 - (o - anisyl) - piperazine dihydrochloride melting at about 193–197° C.

Example 62

A mixture of 9.8 parts of δ-chloropentanophenone and 17.6 parts of 1-(m-tolyl)piperazine is heated for 10 hours at a temperature of 110° C. Upon cooling, 600 parts of ether are added, and the mixture is washed with water. The aqueous layer is separated and extracted with ether. The combined ether layer is evaporated. The oil is taken up in 2-propanol, whereupon dry, gaseous hydrogen chloride is introduced into the solution. The hydrochloride is collected on a filter and recrystallized from a mixture of 2-propanol and methanol to yield 1-(δ-benzoylbutyl)-4-(m-tolyl)piperazine dihydrochloride melting at about 191.5–192.5° C.

Example 63

A mixture of 8.2 parts of γ,p-dichlorobutyrophenone and 13.2 parts of 1-(p-fluorophenyl)piperazine is heated for 10 hours at a temperature of 100–105° C. The mixture is cooled and then treated with water and ether. The ether layer is separated, dried over anhydrous potassium carbonate, and filtered. Anhydrous hydrogen chloride gas is then introduced into the solution, and the solution is cooled. The residue is collected on a filter and recrystallized from an equimolar mixture of acetone and 2-propanol to yield 1-[γ-(p-chlorobenzoyl)propyl]-4-(p-fluorophenyl)piperazine hydrochloride melting at about 207–209° C.

Example 64

A mixture of 10.8 parts of γ,p-dichlorobutyrophenone and 19.6 parts of 1-(p-chlorophenyl)piperazine is heated for 10 hours at the temperature of 100–105° C. The mixture is extracted with 1200 parts of ether and filtered. The filtrate is washed with water, dried over anhydrous potassium carbonate, filtered, and evaporated in vacuo. The residue is recrystallized from a mixture of diisopropyl ether and acetone to yield 1-[γ-(p-chlorobenzoyl)-propyl]-4-(p-chlorophenyl)piperazine melting at about 127–128.5° C.

What is claimed is:

1. A compound of the structural formula

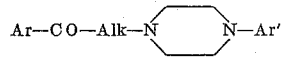

wherein Ar is a member of the class consisting of halophenyl, methoxyphenyl, dimethoxyphenyl, trimethoxyphenyl, and monocyclic aromatic hydrocarbon radicals of less than nine carbon atoms, Ar' is a member of the class consisting of halophenyl, methoxyphenyl, and monocyclic aromatic hydrocarbon radicals of less than nine carbon atoms, and alk is a lower alkylene radical of at least three carbon atoms.

2. A compound of the structural formula

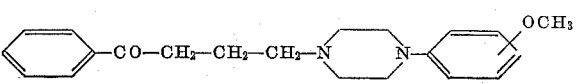

3. 1-(γ-benzoylpropyl)-4-(o-anisyl)piperazine.

4. 1-(γ-benzoylpropyl)-4-(p-anisyl)piperazine.
5. A compound of the structural formula

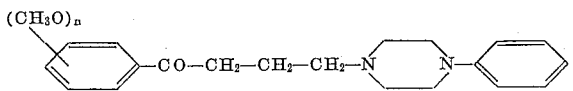

wherein *n* is a positive integer less than three.

6. 1-[γ-(o,p-dimethoxybenzoyl)propyl] - 4 - phenylpiperazine.
7. A compound of the structural formula

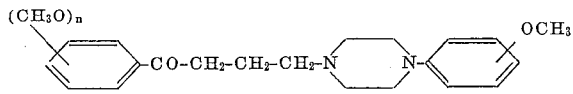

wherein *n* is a positive integer less than three.

8. 1-[γ-(o,p-dimethylbenzoyl)propyl] - 4 - (o-anisyl)-piperazine.
9. 1-[γ-(o-anisoyl)propyl]-4-(o-anisyl)piperazine.
10. A compound of the structural formula

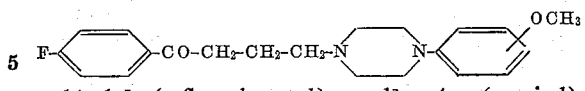

11. 1-[γ-(p-fluorobenzoyl)propyl] - 4 - (o-anisyl)piperazine.
12. 1-[γ-(p-fluorobenzoyl)propyl] - 4 - phenylpiperazine.
13. 1-(γ-benzoylpropyl)-4-phenylpiperazine.

References Cited in the file of this patent

Hampton et al.: Jour. Amer. Chem. Soc., vol. 59, pages 2446–2447 (1937).

UNITED STATES PATENT OFFICE
CERTIFICATE OF CORRECTION

Patent No. 2,997,472                          August 22, 1961

Paul Adriaan J. Janssen

It is hereby certified that error appears in the above numbered patent requiring correction and that the said Letters Patent should read as corrected below.

Column 4, line 17, for "γ-chlorobutylrophenone" read -- γ-chlorobutyrophenone --; column 5, lines 3 and 4, for "avaporated" read -- evaporated --; lines 12 and 13, for "γ-chlorobutylrophenone" read -- γ-chlorobutyrophenone --; column 6, line 4, for "202.15° C." read -- 202.1° C. --; line 10, for "1-[γ-(p-fluorobenzoyl]-4-" read -- 1-[γ-(p-fluorobenzoyl)propyl]-4- --; same column 6, line 44, for "γ-chlorobutylrophenone" read -- γ-chlorobutyrophenone --; column 9, line 28, for "mixtures" read -- mixture --.

Signed and sealed this 8th day of May 1962.

(SEAL)
Attest:

ERNEST W. SWIDER
Attesting Officer

DAVID L. LADD
Commissioner of Patents